(12) United States Patent
Canuteson et al.

(10) Patent No.: US 6,363,035 B1
(45) Date of Patent: Mar. 26, 2002

(54) SEISMIC SENSOR HAVING TWO SYMMETRICAL LEAF SPRINGS AND A METHOD FOR DETECTING SEISMIC MOVEMENT

(75) Inventors: Eric L. Canuteson, Alhambra; Guillermo D. Naranjo, Sierra Madre, both of CA (US)

(73) Assignee: Kinemetrics, Inc., Pasadena, CA (US)

( * ) Notice: Subject to any disclaimer, the term of this patent is extended or adjusted under 35 U.S.C. 154(b) by 0 days.

(21) Appl. No.: 09/574,643

(22) Filed: May 18, 2000

(51) Int. Cl.$^7$ ................................................. H04R 1/00
(52) U.S. Cl. ........................................................ 367/179
(58) Field of Search ................................ 367/179, 178, 367/183; 181/122; 73/652

(56) References Cited

U.S. PATENT DOCUMENTS 4,280,206 A   7/1981   Guralp

FOREIGN PATENT DOCUMENTS

DE           286673 A   *   1/1991

OTHER PUBLICATIONS

E. Wielandt, Mechanical Receivers, Design Principles of Electronic Inertial Seismometers, pp. 354–355. No. 384, Institute of Geophysics.

E. Wielandt et al., The Leaf–Spring Seismometer: Design and Performance, Buletin of the Seismological Society of America, Dec. 1982, pp. 2349, 2353–2354, 2366–2367, vol. 72, No. 6.

* cited by examiner

Primary Examiner—Daniel T. Pihulic
(74) Attorney, Agent, or Firm—Trojan Law Offices

(57) ABSTRACT

A method and a seismic sensor using symmetrical spring geometry to overcome the temperature sensitivity problems associated with seismometers. The seismic sensor includes a base having a pivot point and a vertical axis. The sensor also includes a neutral axis and a carriage that is mounted to the base at the pivot point. The carriage includes a mass, a boom, a center of gravity, and a neutral position. The carriage is in the neutral position when the center of gravity of the carriage is along the neutral axis. Also included in the sensor is a spring, that is attached to the carriage. The spring suspends the carriage in the neutral position and supplies a force that impels the carriage into the neutral position. The spring being symmetrical about the neutral axis while the carriage is in the neutral position. The sensor further includes a first point and a second point for attaching the spring to the carriage and a detector. The detector is attached to the base and senses the displacement of the carriage.

25 Claims, 5 Drawing Sheets

SEISMIC SENSOR HAVING TWO SYMMETRICAL LEAF SPRINGS AND A METHOD FOR DETECTING SEISMIC MOVEMENT

BACKGROUND OF THE INVENTION

1. Field of the Invention

The invention relates generally to seismic sensors, and more specifically to seismic sensors using leaf-springs to suspend the seismic mass.

2. Description of Related Art

In order to achieve a seismic sensor that is relatively small in size, yet capable of detecting infinitesimal seismic activity, it is advantageous for the spring-mass system to (1) have a long period and (2) be compact. Linear springs require an impractical length to achieve a long period while offsetting the force of gravity on the mass. Non-linear springs can have both of the required qualities, and a curved leaf spring is generally a non-linear spring. A constant and challenging problem with maintaining the accuracy and the calibration of a seismic sensor is the temperature sensitivity of the spring used to suspend the mass.

Temperature sensitivity severely limits the sensors ability to accurately detect seismic signals. In order to have a stable and sensitive sensor, temperature sensitivity must be minimized. Several different methods have been used in order to negate the effect temperature has on a spring of a sensor. One method uses two springs, each composed of a different material. Each material has a temperature coefficient that is opposite to the temperature coefficient of the other spring. Thus, as the temperature increases, one of the materials expands and the other material contracts. Thus, the two different temperature coefficients cancel one another out and, as a result, the effect of temperature on the spring is also canceled out.

Manufacturing a leaf spring that is composed of two different materials is expensive. Further, finding two materials having equal and opposite temperature coefficients over a broad temperature range is complex. Therefore, although this method minimizes the temperature sensitivity problem over a restricted range, it is an expensive, complex, and incomplete solution.

From the preceding descriptions, it is apparent that the devices currently being used have significant disadvantages. Thus important aspects of the technology used in the field of invention remain amenable to useful refinement.

SUMMARY OF THE INVENTION

The present invention introduces such refinement. In its preferred embodiments, the present invention has several aspects or facets that can be used independently, although they are preferably employed together to optimize their benefits.

In its preferred embodiment, the seismic sensor has a neutral axis, a base having a pivot point, and a vertical axis. Attached to the base at the pivot point is a carriage which has a mass, a boom, a center of gravity and a neutral position. The carriage being in the neutral position when the center of gravity is along the neutral axis. The spring is also attached to the carriage. The spring suspends the carriage in the neutral position and impels the carriage into the neutral position. The spring is geometrically symmetrical about the neutral axis when the carriage is in the neutral position. The seismic sensor also includes a first point and a second point for attaching the spring to the carriage. Lastly, the seismic sensor includes a detector which is attached to the base, for sensing displacement of the carriage.

This invention minimizes the temperature sensitivity problem because of the symmetry of the spring or springs. Any expansion or contraction of the spring material is compensated for in that the expansion or contraction will be mirrored by the portion of the spring on the other side of the neutral axis. Any change in one side of the spring will result in an equal and opposite change in the opposite side of the spring, thus canceling the major effects of temperature on the sensor.

The following are preferences that are not necessary to practice the invention, they are however, preferred. It is preferred that the seismic sensor also include a force actuator, which is attached to the base, for supplying a force which urges the carriage into the neutral position.

It is also preferred that the detector is a displacement transducer for transforming the displacement of the carriage into an electrical signal. It is further preferred that the first point is a support member and a brace and the second point is a clamp.

It is preferred that the spring includes two springs each spring having a first end and a second end. The first end of each spring is fixed to the carriage via the support member and two braces. The second end of each spring is fixed to the carriage via the clamp. It is preferred that the linear spring coefficient be negligible when the carriage is in the neutral position.

It is also preferred that the displacement transducer include a first and a second capacitor plate and the boom include a third capacitor plate. The first, second and third capacitor plates work in conjunction to transform the displacement of the carriage into an electrical signal. It is further preferred that the pivot point have negligible rotational friction.

Also preferred is that the neutral axis be approximately thirty-five degrees from the vertical axis, and that the ends of the two springs be offset from one another. Further preferred is that the spring be composed of a material having a thermoelastic coefficient of approximately zero, such as, Ni-Span-C alloy.

It is preferred that the force actuator receive output from the displacement transducer which alters the amount of force supplied by the force actuator. The force supplied by the force actuator is in relation to the output from the displacement transducer thereby the greater the displacement of the carriage the larger the force supplied by the force actuator. It is also preferred that the force supplied by the force actuator is a magnetic force which is created by a coil-magnet.

All of the foregoing operational principles and advantages of the present invention will be more fully appreciated upon consideration of the following detailed description, with reference to the appended drawings.

DESCRIPTION OF THE PREFERRED EMBODIMENTS

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

Figure 1:
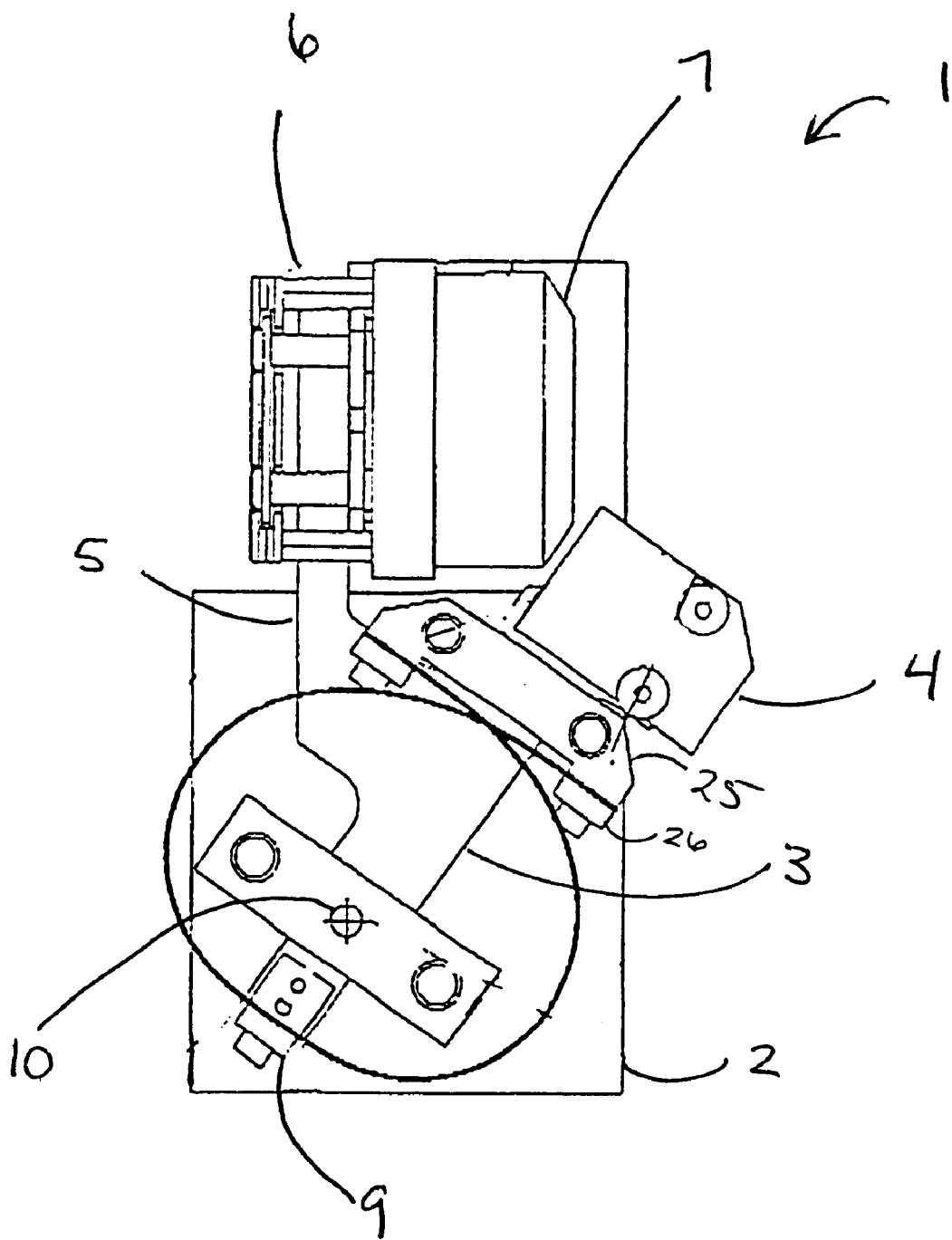
FIG. 1 is a perspective view of the sensor.

The preferred embodiment includes a seismic sensor 1 (FIG. 1) used to detect seismic movement of the earth. The sensor employs a mass-suspension system which uses a mass 4 and two leaf springs (a first spring 20 and a second spring 21). Each spring has a first end and a second end.

The mass and the leaf springs are mounted onto a carriage 3. The carriage has a center of gravity. The carriage is mounted to the base 2 at the pivot point 10. The carriage is mounted to the base with a Bendix flexure 10 for frictionless rotation. Using a Bendix flexure increases the sensor's ability to detect seismic movement of the earth.

The carriage includes a boom 5 which extends from the main body of the carriage 3 into the displacement transducer 6. The displacement transducer is mounted to the base 2. Because the displacement transducer is mounted to the base and the boom is part of the carriage which is pivotally mounted to base, the boom moves relative to the base.

Figure 6:
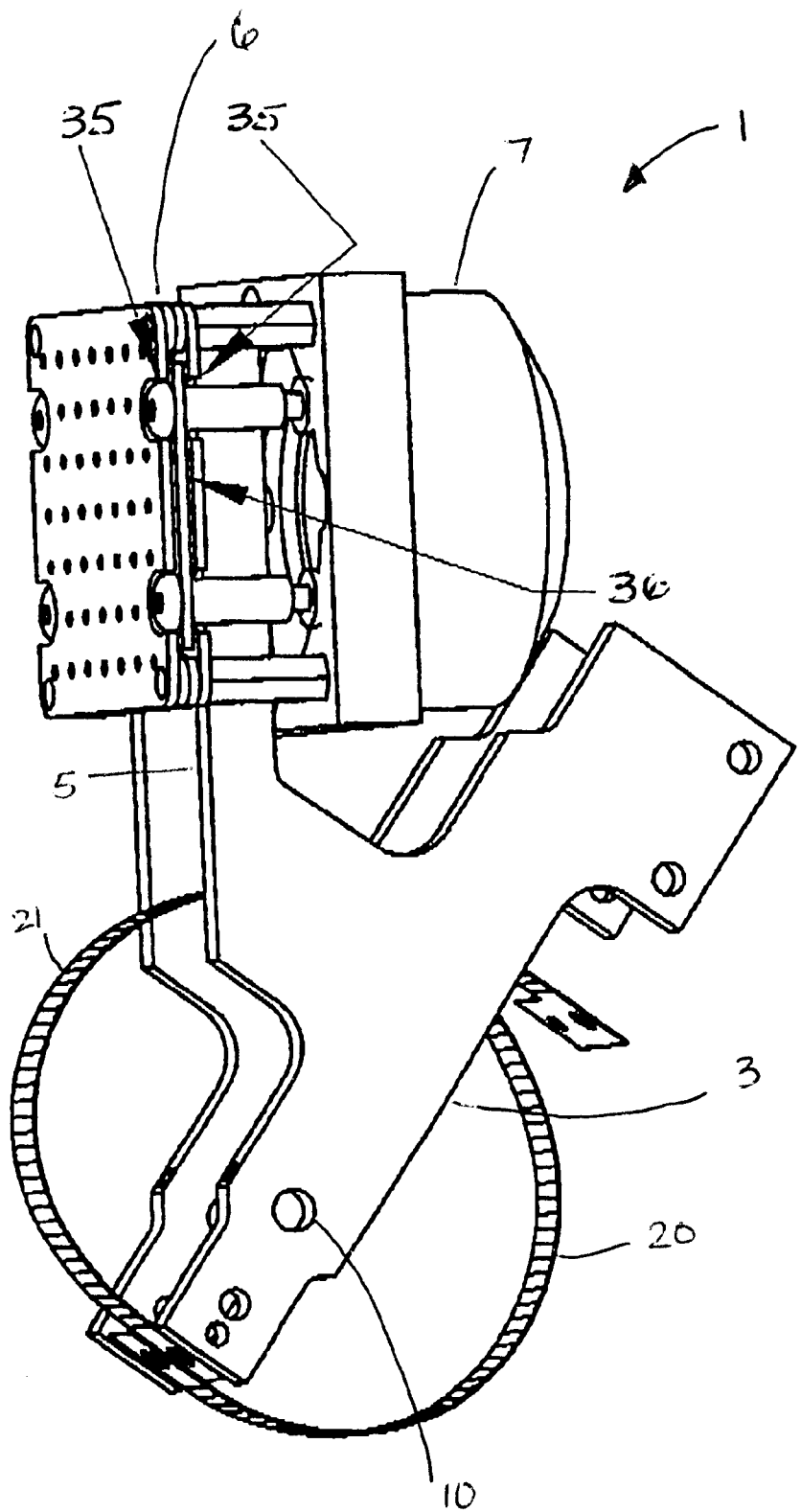
FIG. 6 is a perspective view of the sensor showing the capacitor plates.

The displacement transducer transforms the displacement of the carriage into an electrical signal which is in relation to the amount of displacement of the carriage. The displacement transducer includes two capacitor plates 35 and the boom includes a third capacitor plate 36 (FIG. 6). The interaction between the displacement transducer's capacitor plates and the boom's capacitor plate creates an electrical signal. Thus, seismic movement is detected and measured.

Figure 2:
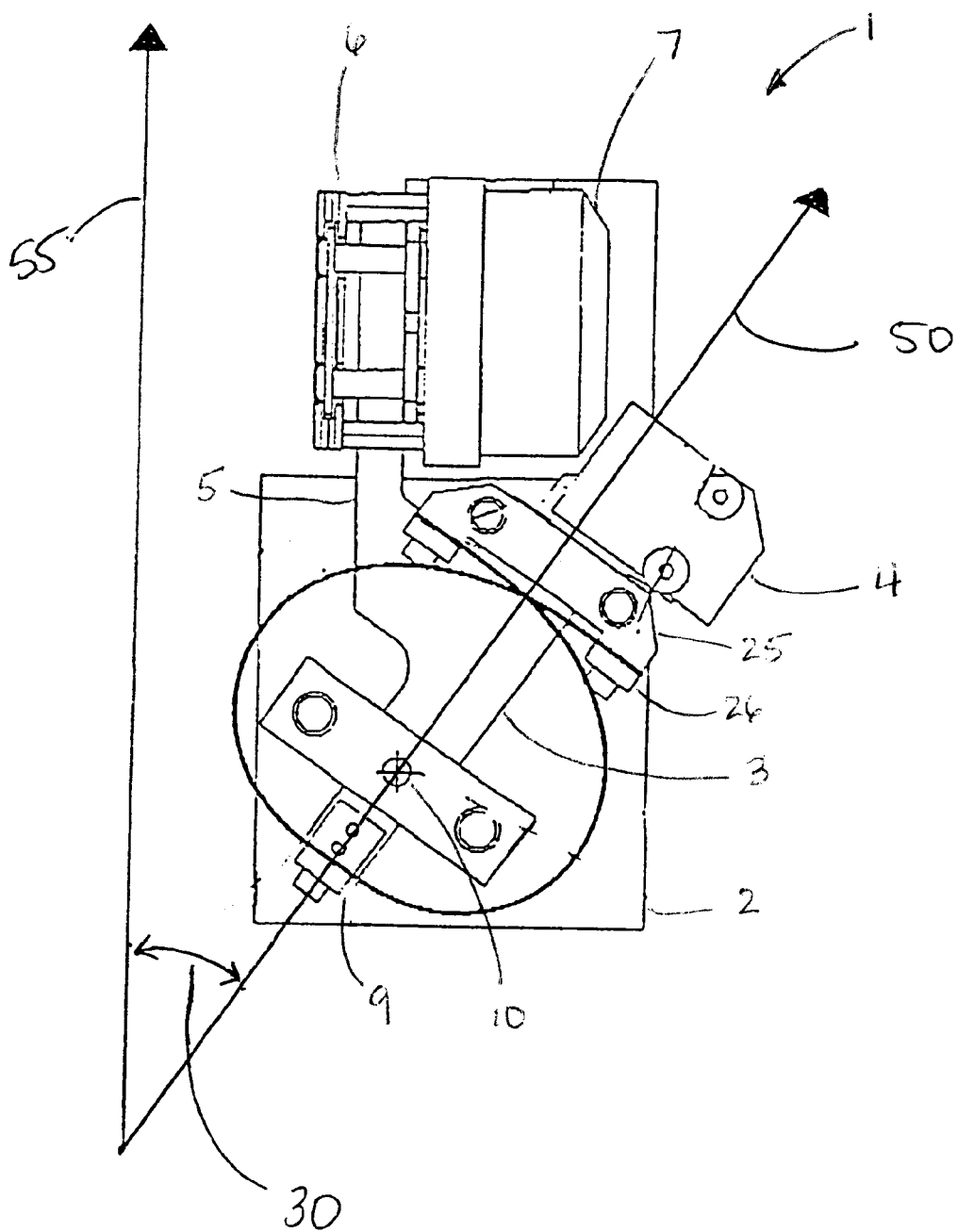
FIG. 2 is a like view showing the neutral axis of the sensor and the angle at which the sensor is in the neutral position.

Also mounted to the base is the force actuator 7. The force actuator receives input from the displacement transducer. The force actuator applies a force, such as a magnetic force, to urge the carriage 3 into the neutral position. The carriage is in the neutral position when the center of gravity of the carriage is along the neutral axis 50 (FIG. 2). The neutral axis in the preferred embodiment is at an angle 30 which is approximately thirty-five (35) degrees from the vertical axis 55. The neutral angle is chosen so that the sensitive axes of three identical sensor elements can form an orthogonal system when the elements are mounted on a plane.

The two springs are mounted onto the carriage via a support member 25. The first end of each springs 20, 21 is mounted between the support member 25 and a brace 26. The second end of each of the springs is mounted to the carriage via the clamp 9.

Figure 3:
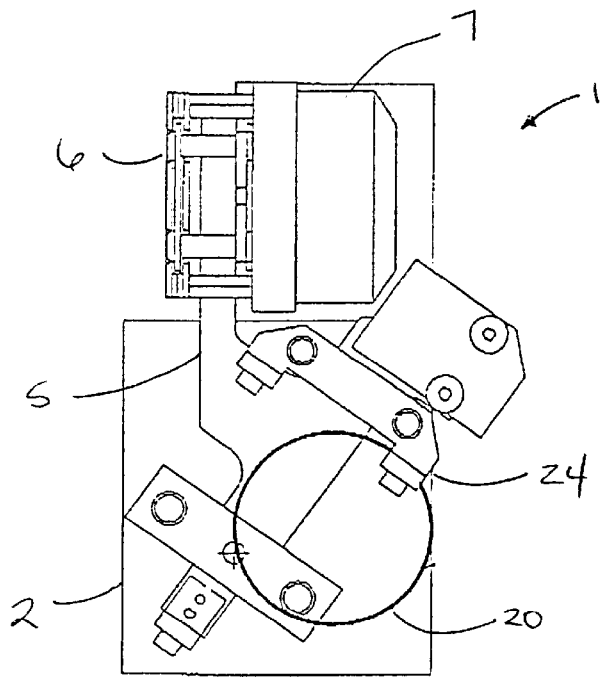
FIG. 3 is a perspective view of the first spring of the preferred embodiment that is attached at the first end to the brace and the second end is not attached to the clamp.
Figure 4:
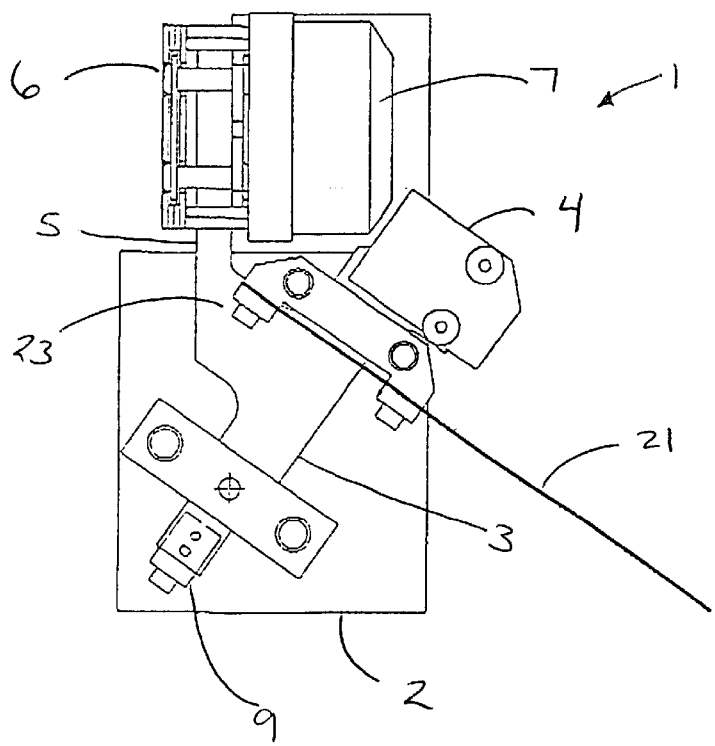
FIG. 4 is a like view of the second spring.

In order to have the carriage suspended in the neutral position, the springs are prestressed. A leaf spring can be prestressed into a multiplicity of shapes from flat to a circle. In the preferred embodiment the first leaf spring 20 is prestressed (FIG. 3) such that when the opposing end of the first leaf spring is not held by the clamp 9, it is circular in shape. The second leaf spring,21 (FIG. 4) is prestressed such that when it is not held by the clamp 9, it is flat.

Figure 5:
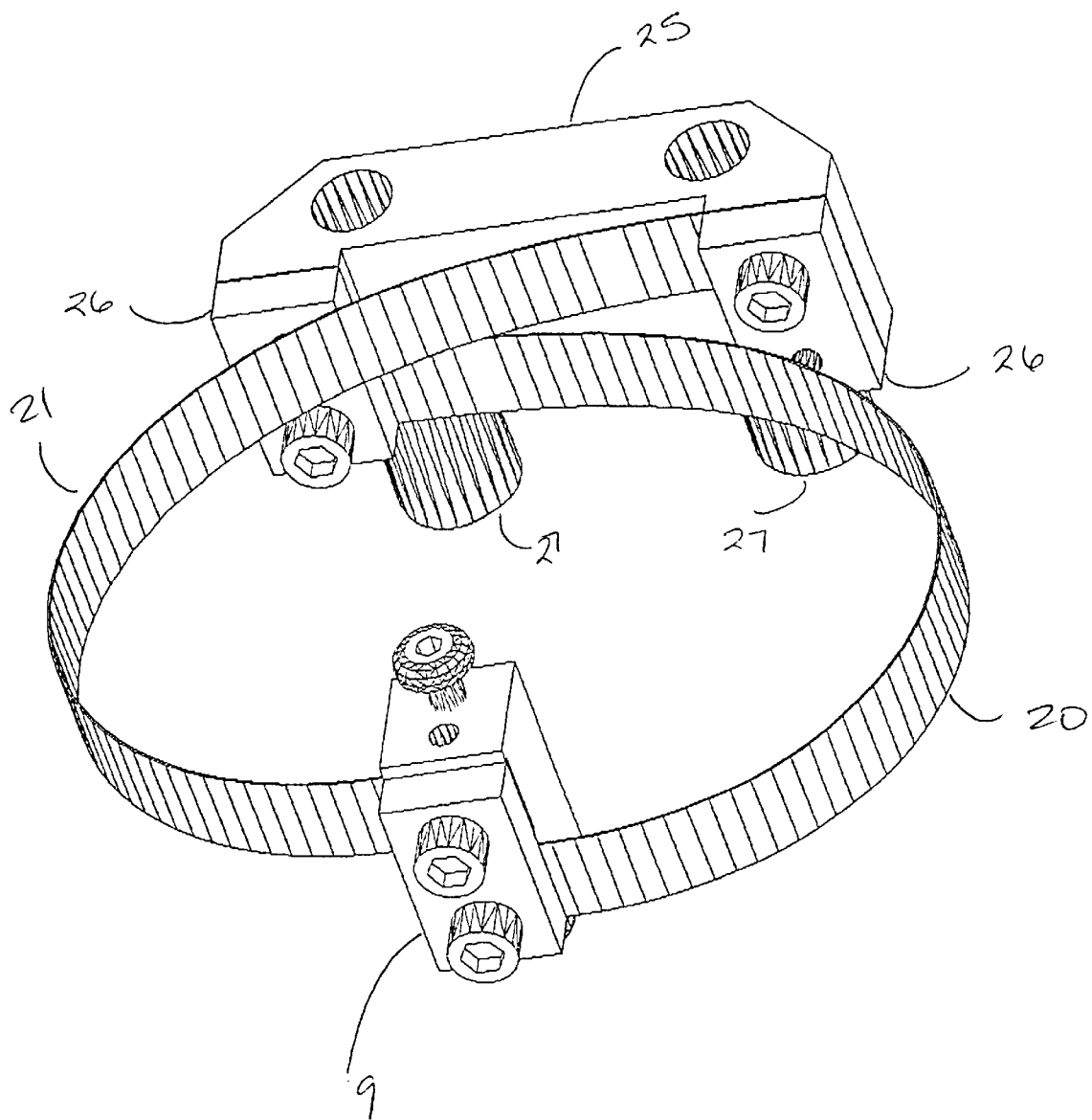
FIG. 5 is an enlarged perspective view of the spring arrangement.

Once the first and second end of each spring is attached (FIG. 5) the springs are symmetrical to each other about the neutral axis. They are also offset along an axis that is perpendicular to the neutral axis from each other at the points of attachment, namely, at the support member and the clamp. Offsetting the first ends and the second ends of the springs offset increases the number of spring shapes available to achieve the necessary arrangement such that the carriage is suspended in the neutral position along the neutral axis.

During seismic movement the following occurs. The base of the sensor moves with the seismic movement, the carriage, however, does not. The inertia of the carriage, in conjunction with the fact that the carriage is pivotally mounted to the base, causes the carriage to move relative to the base. Therefore the boom, which is integral to the carriage, also moves relative to the base. The displacement transducer is mounted to the base and, as a result, the boom moves within the displacement transducer creating an electrical signal. The signal is relayed to the force actuator which varies the force it generates in relation to the amount of displacement of the boom. The force urges the carriage into the neutral position. This force increases the sensitivity and accuracy of the sensor.

A method for detecting seismic movement using a seismic sensor. The sensor has a neutral axis and a spring. The spring suspends the mass of the sensor in the neutral position. The mass is in the neutral position when the center of gravity of the mass is along the neutral axis. The spring is arranged such that it is symmetrical about the neutral axis when the center of gravity of the mass is in the neutral position. The seismic sensor can use two springs symmetrically arranged in the neutral position as well.

We claim:

1. A seismic sensor comprising:
   a base having a pivot point and a vertical axis;
   a neutral axis;
   a carriage, mounted to the base at the pivot point, having a mass, a boom, a center of gravity, and a neutral position, the carriage is in the neutral position when the center of gravity of the carriage is along the neutral axis;
   a spring, attached to the carriage, for suspending the carriage in the neutral position and for supplying a force that impels the carriage into the neutral position, the spring being symmetrical about the neutral axis while the carriage is in the neutral position;
   a first point and a second point for attaching the spring to the carriage; and
   a detector, attached to the base, for sensing displacement of the carriage.

2. The seismic sensor of claim 1 further comprising a force actuator, attached to the base, for supplying a force which urges the carriage into the neutral position.

3. The seismic sensor of claim 1 wherein the detector comprises a displacement transducer for transforming the displacement of the carriage into an electrical signal.

4. The seismic sensor of claim 1 wherein the first point comprises a support member and a brace and the second point comprises a clamp.

5. The seismic sensor of claim 1 wherein the spring comprises a first spring and a second spring, each spring having a first end and a second end.

6. The seismic sensor of claim 5 wherein the support member and the two braces fix the first end of each spring to the carriage and the clamp fixes the second end of each of the springs to the carriage.

7. The seismic sensor of claim 1 wherein the neutral position of the carriage is defined by the linear spring coefficient being negligible.

8. The seismic sensor of claim 3 wherein the displacement transducer comprises a first and second capacitive plate and the boom comprises a third capacitive plate, the first, second, and third capacitive plates work in conjunction to transform the displacement of the carriage into an electrical signal.

9. The seismic sensor of claim 1 wherein the pivot point has negligible rotational friction.

10. The seismic sensor of claim 1 wherein the neutral axis is approximately thirty-five degrees from the vertical axis.

11. The seismic sensor of claim 5 wherein the first end and the second end of the first spring and the second spring are offset along an axis that is perpendicular to the neutral axis.

12. The seismic sensor of claim 1 wherein the spring is composed of a material having a thermoelastic coefficient of approximately zero.

13. The seismic sensor of claim 12 wherein the spring material is Ni-Span-C alloy.

14. The seismic sensor of claim 3 wherein the force actuator receives output from the displacement transducer which alters the amount of force supplied by the force actuator in relation to the output from the displacement transducer thereby the greater the displacement of the carriage the larger the force supplied by the force actuator.

15. The seismic sensor of claim 14 wherein the force supplied by the force actuator comprises a magnetic force created by a coil-magnet.

16. A seismic sensor comprising:

a base having a pivot point and a vertical axis;

a neutral axis;

a carriage, mounted to the base at the pivot point, having a mass, a boom, a center of gravity and a neutral position, the carriage being in the neutral position when the center of gravity is along the neutral axis;

two springs, attached to the carriage, for suspending the carriage in the neutral position and for supplying a force that impels the carriage to the neutral position, the spring being symmetrical about the neutral axis while the carriage is in the neutral position;

a first point and a second point for attaching the spring to the carriage; and a displacement transducer, attached to the base, for transforming the displacement of the carriage into an electrical signal.

17. The seismic sensor of claim 16 wherein the neutral position of the carriage is defined by the linear spring coefficient being negligible.

18. The seismic sensor of claim 17 wherein the first end and the second end of the first spring and the second spring are offset along an axis that is perpendicular to the neutral axis.

19. A seismic sensor comprising:

a base having a pivot point and a vertical axis;

a neutral axis;

a carriage, mounted to the base at the pivot point, having a mass, a boom, a center of gravity, and a neutral position, the carriage being in the neutral position when the center of gravity is along the neutral axis;

a spring, attached to the carriage, for suspending the carriage in the neutral position and for supplying a force that impels the carriage to the neutral position, the spring being symmetrical about the neutral axis while the carriage is in the neutral position, the neutral position of the carriage being defined by the linear spring coefficient being negligible;

a support member and a brace and the second point, attached to the carriage, for attaching the spring to the carriage;

a displacement transducer, attached to the base, for transforming the displacement of the carriage into an electrical signal, the displacement transducer comprises a first and second capacitive plate and the boom comprises a third capacitive plate, the first, second, and third capacitive plates work in conjunction to transform the displacement of the carriage into an electrical signal; and a force actuator, attached to the base, for supplying a magnetic force which urges the carriage into the neutral position, the force actuator receives output from the displacement transducer which alters the amount of magnetic force supplied by the force actuator in relation to the output from the displacement transducer thereby the greater the displacement of the carriage the larger the magnetic force supplied by the force actuator.

20. The seismic sensor of claim 19 wherein the spring comprises a first spring and a second spring, each spring having a first end and a second end.

21. A method of detecting seismic movement using a seismic sensor having a neutral axis and a mass of sufficient weight to be capable of measurable displacement during the seismic movement; said method comprising the steps of:

suspending the mass in a neutral position using a leaf spring, the leaf spring being symmetrical about the neutral axis when the mass is in the neutral position; and sensing the displacement of the mass.

22. The method of claim 21 wherein the leaf spring has a negligible linear spring coefficient.

23. The method of claim 21 wherein the leaf spring is made from material having a negligible thermoelastic coefficient.

24. The method of claim 21 wherein the leaf spring comprises two leaf springs.

25. The method of claim 24 wherein the two leaf springs are offset from one another.

* * * * *